3,384,682
PROCESS OF PREPARING VINYL AROMATIC POLYMERS MODIFIED WITH POLYPHENYLENE OXIDE
Michael Erchak, Jr., Ridgewood, Frederick E. Carrock, Paramus, and Karl F. Koch, Berkeley Heights, N.J., assignors to Rexall Drug and Chemical Company, Los Angeles, Calif., a corporation of Delaware
No Drawing. Filed Dec. 9, 1965, Ser. No. 523,482
12 Claims. (Cl. 260—874)

ABSTRACT OF THE DISCLOSURE

Incorporating about 2 to less than about 10 weight percent of a polyphenylene oxide homopolymer during the suspension of a monovinyl aromatic compound in water results in an improved polymer product. The resulting suspension is polymerized at elevated temperatures in the presence of a minor amount of organic peroxide initiator to obtain the modified monovinyl aromatic polymer product.

---

This invention relates to novel modified vinyl aromatic polymers and to the process for preparing such polymers. More particularly, the invention pertains to novel modified polystyrene polymers and to their preparation by a suspension polymerization process.

There are numerous prior art proposals for the production of vinyl aromatic polymers, and especially polystyrene, having improved properties over the conventional, commercially available vinyl aromatic polymers. For some commercial applications it would be highly desirable to obtain such polymers having improved impact, heat deflection and surface hardness characteristics. It is readily apparent that the improvements cannot be achieved at the expense of other properties or significant decreases in monomer conversion levels. Moreover, from the standpoint of large scale commercial operations it is necessary to avoid the use of additional equipment or increases in the polymerization time cycles. On the basis of such criteria, a number of the prior art proposals for polymer modification have proved to be somewhat impractical.

One object of the present invention is to provide novel modified vinyl aromatic polymers having certain improved physical properties.

Another object of the present invention is to provide novel modified polystyrene polymers having improved impact, heat deflection, and surface hardness characteristics.

A further object of the present invention is to provide a suspension polymerization proceess for producing improved vinyl aromatic polymers which avoids the difficulties encountered in various prior art proposals.

A still further object of the present invention is to provide a suspension polymerization process for the preparation of polystyrene having certain improved physical properties.

These and other objects of the invention will become readily apparent from the ensuing disclosure and illustrative embodiments.

In accordance with the present invention, it has now been found that novel polymeric products can be prepared by polymerizing a vinyl aromatic monomer in the presence of a polyphenylene oxide polymer. The latter is a recently developed thermoplastic, of high molecular weight, possessing certain outstanding physical properties. Descriptions of the polyphenylene oxide polymers and the process for their preparation are found in "Chemical and Engineering News," pp. 57–58, Dec. 7, 1964; and in British Patent No. 930,933.

In general, the novel polymers of this invention are prepared by the so-called suspension polymerization of the vinyl aromatic monomer in the presence of a minor amount of the polyphenylene oxide polymer.

The suspension polymerization process generally comprises dispersing the vinyl aromatic compound in water with the aid of organic or inorganic dispersants and then conducting the polymerization at elevated temperatures in the presence of a minor amount of peroxide initiator. The polymerization reaction is quite often performed in a stirred, jacketed autoclave reaction system. The resulting polystyrene product is in the form of small beads, which are washed to remove the dispersant, if present. Typical dispersants or suspending agents include carboxymethyl cellulose, hydroxethyl cellulose, polyvinyl alcohol, methyl cellulose, sulfonated polystyrenes, polyglycol ethers, and the like. The use of hydroxyethyl cellulose is especially preferred. The amount of hydroxyethyl cellulose, having a viscosity of from about 1500–3500 cps. at 25° C. for a 1% aqueous solution, used will range from about 0.025 to 1.5% by weight, and preferably from about 0.075 to 0.40% by weight, based on the weight of the water.

Suitable initiators which can be used during the suspension polymerization are organic peroxides such as dibenzoyl peroxide, dicaproyl peroxide, dilauroyl peroxide, t-butyl perbenzoate, di-t-butyl peroxide, t-butyl peracetate, cyclohexanone peroxide, etc. In accordance with another feature of the present invention, it has been found advantageous to carry out the suspension polymerization utilizing a dual peroxide initiator system. Thus, for example, outstanding results have been achieved with an initiator system comprising dibenzoyl peroxide and t-butyl perbenzoate. Other preferred dual peroxide initiator systems are dibenzoyl peroxide and t-butyl peroxide and t-butyl peracetate; cyclohexanone peroxide and dicumyl peroxide; dilauroyl peroxide and t-butyl perbenzoate; and the like. In each of these systems the first peroxide is considered to be a low temperature initiator whereas the second one is considered to be a high temperature initiator.

The total amount of peroxide initiators employed will range from about 0.025 to 1% by weight, and preferably from about 0.1 to 0.5% by weight, based on the total weight of the polymerizable monomeric feed material, i.e., the monovinyl aromatic compound. Although equal amounts of the two initiators may be employed, it is possible to use about 0.075 to 0.3% by weight of one initiator, such as the low temperature peroxide initiator, and about 0.025 to 0.2% by weight of the second peroxide initiator, such as the high temperature peroxide initiator.

As is well know in this art, other additives which can be employed in the polymerization reaction mixture include conventional lubricants, dyes, plasticizers and antioxidants. For some purposes it is more advantageous to admix such additives with the polymer products followed by extrusion to produce modified vinyl aromatic polymers encompassed by this invention. In general, only minor amounts of such additives will be employed.

Although styrene is the preferred monovinyl aromatic or vinyl aryl compound employed in the improved process of this invention, other related compounds may also be readily utilized as the monomeric feed material. Examples of such compounds include alkyl and/or halogen derivatives of styrene such as alpha-methylstyrene and nuclear substituted monomers such as methylstyrenes, ethylstyrenes, isopropylstyrenes, butylstyrenes, both mono- and dialkyl forms, etc., the chloro- and dichlorostyrenes, mono- and dibromostyrenes, alkyl halostyrenes, as well as mixtures of these compounds with styrene or with each other. Other monomers which may be substituted for a minor proportion of the styrene that is from 1 to 50% include acrylonitrile, methacrylonitrile, methyl methacrylate, methacrylic acid, and the like. In general, the vinyl aromatic component will comprise from about 40 to 80% by weight of the total weight of the reaction mixture, and preferably from about 45 to 90% by weight, the remainder being comprised of the polyphenylene oxide additives and a second monomer when used in a copolymerization reaction.

The polyphenylene oxide polymer component of the reaction comprises recurring units having the following structural formula:

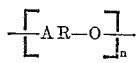

wherein AR is a divalent aryl radical and $n$ is an integer from 10 to 1000 or higher; that is, these polymers have molecular weights ranging from about 1,000 to 1,000,000 or higher, preferably 10,000 to 100,000. The divalent aryl radical may be either unsubstituted or substituted and includes such radicals as phenylene, chlorophenylene, naphthalene, tolylene, and the like.

This polyphenylene oxide polymer can also have recurring structural units such as

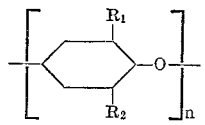

wherein $R_1$ and $R_2$ can be either hydrogen; alkyl radicals having from 1 to 10 carbon atoms such as methyl, ethyl, propyl, isopropyl, butyl, pentyl, etc.; halogens such as chlorine, bromine, etc.; as well as aralkyl, alkaryl and aryl radicals having from 7 to 20 carbons. $R_1$ and $R_2$ may either be the same or different. The integer $n$ will be at least 10 and as high as 5,000 or higher. When $R_1$ and $R_2$ are alkyl groups, the polymer composition is a poly-2,6-dialkyl-phenylene oxide; and where $R_1$ and $R_2$ are methyl groups the polymer is poly-2,6-dimethyl-1,4-phenylene oxide. When $R_1$ and $R_2$ are methyl and hydrogen for example, then the polymer is poly-2-methyl-1,4-phenylene oxide.

In general, the polyphenylene oxide polymers employed in the process of this invention are obtained by the oxidative coupling of phenolic compounds, such as 2,6-dimethylphenol. The phenols are oxidized by oxidizing gas such as oxygen, air, etc. in the presence of a copper-amine complex catalyst. The reaction can be carried out in either homogeneous or heterogeneous polymerization systems. It will be understood, however, that the exact method of preparing the polyphenylene oxides does not constitute an essential feature of the present invention.

In accordance with the present suspension polymerization process, the amount of polyphenylene oxide polymer employed has been found to be quite important. If the amount of the polyphenylene oxide is greater than 10% by weight, based on the weight of the polymer product, incomplete conversion of the monomer(s) to polymer resulted. It is preferred, therefore, to employ less than 10% by weight of the polyphenylene oxide, and especially preferred amounts ranging from about 2 to 7% by weight.

The water employed in the suspension polymerization process of this invention can be used in approximately equal quantities with the vinyl aromatic compound, although it will be understood that the amount of water used need only be sufficient to effect the desired degree of monomer suspension. In general, the preferred reaction mixture will comprise a water to monomer ratio of from about 0.8:1 to 2:1.

The usual operating procedures and conditions will be employed in carrying out the suspension polymerization process of this invention. Thus, it is important to carry out the polymerization initially below a temperature of about 100° C. until a definite degree of polymerization or conversion from monomer to polymer has been attained. Once this degree of conversion (e.g. 60 to 90%) has been reached, the temperature is increased to a range of about 110° to 135° C. to complete the polymerization. With styrene as the feed material the initial polymerization temperature may range from about 85° to 95° C., and preferably about 90° C. The initial polymerization temperature is maintained for about 5 to 9 hours, preferably from about 6 to 7 hours. The temperature is then raised to about 110° to 120° C., preferably about 115° C., over a period of about three hours, although this period may be as long as 5 hours. This temperature is then maintained for about 2 to 4 hours, and preferably for about 3.5 hours.

For purposes of convenience, the present invention will be hereinafter described in greater detail with respect to the preparation of modified polystyrene having improved physical properties. Styrene is the monomeric feed material and is fed to the reaction zone along with water, the suspending agent, the minor amount of the polyphenylene oxide polymer, and any other additives, if desired; and the resulting reaction mixture is subjected to the above described polymerization conditions. The resulting modified polystyrene beads may be recovered and used as such or subjected to a conventional extrusion step to prepare pellet-like polymer products.

The invention will be more fully understood by reference to the following illustrative embodiments.

EXAMPLE

The suspension polymerization procedure employed in Runs 2 to 4 set forth in the table were carried out by first charging filtered water to a glass-lined reactor provided with a standard stirrer. Polyphenylene oxide polymer was dissolved in styrene with agitation, then peroxides were added to the resulting mixture, and the total mixture was added to the water containing the suspending agent. The reactor was swept free with nitrogen, and sealed under a nitrogen pressure (i.e. 20 p.s.i.). The reaction mixture was then heated to initiate polymerization. Other reaction conditions are set forth in the table.

Run 1 was carried out in exactly the same manner except that no polyphenylene oxide polymer was added with the result that conventional polystyrene polymer products were obtained.

The polyphenylene oxide polymer employed in each of the runs is poly-2,6-dimethyl-1,4-phenylene oxide having an intrinsic viscosity of 0.65 dl./g. determined at 25° C. It is also characterized by a brittle point of less than −275° F.; a heat deflection temperature of about 375° F. at a 264 p.s.i. load; and a tensile modulus between 330,000 and 340,000 p.s.i. at 257° F.

The polymer product was recovered from the resulting reaction product mixture by the use of conventional filtration and water washing steps.

TABLE

|  | 1 | 2 | 3 | 4 [a] |
|---|---|---|---|---|
| Formulation: | | | | |
| Styrene, percent | 100 | 95 | 95 | 90 |
| Water/Styrene Ratio | 1 | 1 | 1 | 1 |
| Hydrozyethyl Cellulose, percent | 0.2 | 0.2 | 0.2 | 0.2 |
| Polyphenylene Oxide Polymer | None | 5 | 5 | 10 |
| Benzoyl Peroxide, percent | 0.19 | .19 | 0.19 | 0.35 |
| t-Butyl Perbenzoate, percent | 0.032 | 0.032 | 0.032 | 0.07 |
| Polymerization Conditions: [b] | | | | |
| Temperature Range, ° C | 90–115 | 90–115 | 90–115 | 88–115 |
| Cycle Time, Hrs | 10 | 10 | 10 | 13 |
| Physical Properties: | | | | |
| Melt Flow (190° C., 5,000 g.) [d] | 0.8 | 0.6 | 0.5 | |
| Izod Impact (ft. lbs./in.) [e] | 0.3 | 1.0 | 1.0 | |
| Rockwell Hardness, M Scale | 65 | 70 | 71 | |
| Deflection Temp. (264 p.s.i.), ° C [f] | 88 | 91 | 91 | |
| Tensile Fail, p.s.i. | 7,100 | 7,100 | 7,100 | |
| Flexural Yield Strength, p.s.i. | 9,000 | 9,000 | 9,000 | |
| Elongational Fail, percent | 3 | 3 | 3 | |

[a] Conversion was incomplete.
[b] Conditions used in Runs 1 to 3: 6 hrs. at 90° C. 0.5 at 90°–115° C. 3.5 hrs. at 115° C.
[c] Conditions used in Run 4: 7 hrs. at 9° C. 0.5 hr. at 90°–115° C. 5.5 hrs. at 115° C.
[d] Grams/10 minutes: ASTM D-1238-57T.
[e] ASTM D-256-56.
[f] ASTM D-648-56.

The above data show that modified vinyl aromatic polymers having certain enhanced physical properties can be prepared in accordance with the present invention. Comparing the conventional polystyrene product Run 1 with the polyphenylene oxide modified polystyrene of Runs 2 and 3 reveals that significant improvements were attained in impact, surface hardness, and heat deflection temperature properties. In contrast to rubber-modified styrene graft polymers, the use of polyphenylene oxide polymer does not adversely affect transparency and mechanical properties such as tensile and flexural properties. Rubber-modified impact polystyrenes also show reduced heat deflection and surface hardness characteristics. Such polymer products would be particularly suitable for such commercial applications as blow molded bottles and related products as well as various other products requiring transparency and improved impact properties.

In Run 4 the use of a higher polyphenylene oxide polymer concentration in the polymerization reaction mixture resulted in incomplete conversion. The use of a somewhat higher peroxide initiator content and a long polymerization time did not overcome this problem.

While particular embodiments of this invention are described above it will be understood that the invention is obviously subject to variations and modifications without departing from its broader aspects. Thus, for example, other known vinyl aromatic compounds can readily be employed in place of the preferred styrene monomer feed material. Moreover, other peroxide initiator systems can be employed without encountering deleterious results. It is also possible to employ various suspension polymerization procedures in carrying out the process of this invention.

What is claimed is:

1. In a process for the polymerization of a monovinyl aromatic compound comprising the formation of a suspension of said monovinyl aromatic compound in water and heating said suspension at elevated temperatures in the presence of a minor amount of an organic peroxide initiator, the improvement which comprises incorporating from about 2 to less than about 10% by weight based on the weight of the polymer product of a polyphenylene oxide homopolymer having a molecular weight ranging from about 1,000 to 1,000,000 in said suspension prior to heating to obtain a modified monovinyl aromatic polymer product.

2. The process of claim 1 wherein said monovinyl aromatic compound is styrene.

3. The process of claim 1 wherein at least two organic peroxide initiators are present in the suspension.

4. The process of claim 1 wherein said polyphenylene oxide homopolymer is poly-2,6-dimethyl-1,4-phenylene oxide.

5. The process of claim 1 wherein the amount of said polyphenylene oxide homopolymer is from about 2 to 7% by weight based on the weight of the polymer product.

6. In a suspension process for the polymerization of styrene comprising suspending styrene monomer in water and heating the resulting suspension at elevated temperatures in the presence of a minor amount of at least one low temperature organic peroxide initiator and at least one high temperature organic peroxide initiator, the improvement which comprises incorporating from about 2 to less than about 10% by weight based on the weight of the polymer product of a polyphenylene oxide homopolymer having a molecular weight ranging from about 1,000 to 1,000,000 in said suspension prior to heating to obtain a modified polystyrene polymer product.

7. The suspension polymerization process of claim 6 wherein the heating is carried out in the presence of benzoyl peroxide and t-butyl perbenzoate initiators.

8. The suspension polymerization process of claim 6 wherein said polyphenylene oxide homopolymer is poly-2-methyl-1,4-phenylene oxide.

9. The suspension polymerization process of claim 6 wherein said polyphenylene oxide homopolymer is poly-2,6-dialkyl phenylene oxide.

10. The suspension polymerization process of claim 9 wherein said poly-2,6-dialkyl phenylene oxide is poly-2,6-dimethyl-1,4-phenylene oxide.

11. A suspension polymerization process for preparing modified polystyrene polymer which comprises forming an aqueous suspension of styrene monomer and from 2 to less than about 10% by weight based on the weight of the polymer product of poly-2,6-dimethyl-1,4-phenylene oxide homopolymer, heating the resulting suspension at elevated temperatures in the presence of a dual initiator system comprising benzoyl peroxide and t-butyl perbenzoate, and recovering a modified polystyrene homopolymer from the resulting reaction product mixture.

12. The process of claim 11 wherein the amount of said poly-2,6-dimethyl-1,4-phenylene oxide homopolymer is from about 2 to 7% by weight.

References Cited

UNITED STATES PATENTS

| | | | |
|---|---|---|---|
| 3,332,910 | 7/1967 | Mudde | 260—874 |
| 3,356,761 | 12/1967 | Fox | 260—895 |

MURRAY TILLMAN, *Primary Examiner.*

J. T. GOOLKASIAN, *Assistant Examiner.*